(12) United States Patent
Pance et al.

(10) Patent No.: US 9,247,611 B2
(45) Date of Patent: Jan. 26, 2016

(54) LIGHT SOURCE WITH LIGHT SENSOR

(75) Inventors: Aleksandar Pance, Saratoga, CA (US);
Duncan Kerr, San Francisco, CA (US);
Brett Bilbrey, Sunnyvale, CA (US);
Brandon Dean Slack, Campbell, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 12/476,067

(22) Filed: Jun. 1, 2009

(65) Prior Publication Data

US 2010/0301755 A1 Dec. 2, 2010

(51) Int. Cl.
*H05B 37/02* (2006.01)
*H05B 33/08* (2006.01)

(52) U.S. Cl.
CPC ........ *H05B 33/0869* (2013.01); *H05B 33/0818* (2013.01)

(58) Field of Classification Search
CPC ........... H05B 37/0218; H05B 33/0845; H05B 33/0869; H05B 37/02; H05B 33/0818; Y02B 20/46
USPC .......... 315/308, 149, 150, 158, 159, 291, 307
See application file for complete search history.

(56) References Cited

U.S. PATENT DOCUMENTS

| | | | | |
|---|---|---|---|---|
| 3,060,790 | A | * | 10/1962 | Ward .............................. 356/405 |
| 3,754,209 | A | * | 8/1973 | Molloy et al. ................. 340/912 |
| 4,855,740 | A | | 8/1989 | Muramatsu et al. |
| 5,040,479 | A | | 8/1991 | Thrash |
| 5,256,913 | A | * | 10/1993 | Sommer ........................ 327/514 |
| 5,317,105 | A | | 5/1994 | Weber |
| 5,342,991 | A | | 8/1994 | Xu et al. |
| 5,406,071 | A | * | 4/1995 | Elms .......................... 250/214 A |
| 5,456,955 | A | | 10/1995 | Muggli |
| 5,770,898 | A | | 6/1998 | Hannigan et al. |
| 5,975,953 | A | | 11/1999 | Peterson |
| 6,180,048 | B1 | | 1/2001 | Katori |

(Continued)

FOREIGN PATENT DOCUMENTS

| | | |
|---|---|---|
| CN | 201185147 | 1/2009 |
| EP | 1566686 | 8/2005 |

(Continued)

OTHER PUBLICATIONS

Author Unknown, "Electronic Polymers, Semiconducting Polymers and Light Emitting Polymers—Focus of Polythiophene," Azom.com, http://www.azom.com/details.asp?ArticleID=2772, at least as early as Dec. 1, 2005.

(Continued)

*Primary Examiner* — Thai Pham
(74) *Attorney, Agent, or Firm* — Brownstein Hyatt Farber Schreck, LLP

(57) ABSTRACT

There are provided systems, devices and methods for operating a light source with a light sensor to provide a desired light output. In particular, in one embodiment, there is provided a light control system. The light control system includes a light source and a light sensor that share a common light pathway. Additionally, the light control system includes a controller electrically coupled to the light source and the light sensor. The controller operates the light source and the light sensor alternatively during a periodic cycle having a frequency of approximately 60 Hz or greater to achieve a desired visual effect based on ambient lighting conditions.

22 Claims, 14 Drawing Sheets

(56) References Cited

U.S. PATENT DOCUMENTS

| | | | |
|---|---|---|---|
| 6,347,882 B1* | 2/2002 | Vrudny et al. | 362/561 |
| 6,416,196 B1 | 7/2002 | Lemarchand et al. | |
| 6,545,668 B1 | 4/2003 | Hayama | |
| 6,654,174 B1 | 11/2003 | Huang | |
| 6,713,672 B1 | 3/2004 | Stickney | |
| 6,724,370 B2 | 4/2004 | Dutta et al. | |
| 6,762,381 B2 | 7/2004 | Kunthady et al. | |
| 6,770,212 B2 | 8/2004 | Hayashizaki | |
| 6,797,902 B2 | 9/2004 | Farage et al. | |
| 6,800,805 B2 | 10/2004 | Deguchi | |
| 6,806,815 B1 | 10/2004 | Kaikuranta et al. | |
| 6,834,294 B1 | 12/2004 | Katz | |
| 6,879,317 B2 | 4/2005 | Quinn et al. | |
| 7,001,060 B1 | 2/2006 | Kimura | |
| 7,019,242 B2 | 3/2006 | Kim | |
| 7,053,799 B2 | 5/2006 | Yu et al. | |
| 7,067,753 B1 | 6/2006 | Cheng | |
| 7,133,030 B2 | 11/2006 | Bathiche | |
| 7,161,587 B2 | 1/2007 | Beck et al. | |
| 7,221,332 B2 | 5/2007 | Miller et al. | |
| 7,223,008 B2 | 5/2007 | Henriet | |
| 7,236,154 B1 | 6/2007 | Kerr et al. | |
| 7,281,837 B2 | 10/2007 | Yue et al. | |
| 7,283,066 B2 | 10/2007 | Shipman | |
| 7,315,908 B2 | 1/2008 | Anderson | |
| 7,326,154 B2 | 2/2008 | Foley | |
| 7,329,998 B2* | 2/2008 | Jungwirth | 315/291 |
| 7,364,339 B2 | 4/2008 | Park | |
| 7,414,213 B2 | 8/2008 | Hwang et al. | |
| 7,417,624 B2 | 8/2008 | Duff | |
| 7,453,441 B1 | 11/2008 | Iorfida et al. | |
| 7,470,866 B2 | 12/2008 | Dietrich et al. | |
| 7,473,139 B2 | 1/2009 | Barringer et al. | |
| 7,501,960 B2* | 3/2009 | Price et al. | 340/691.6 |
| 7,557,312 B2 | 7/2009 | Clark et al. | |
| 7,582,839 B2 | 9/2009 | Kyowski et al. | |
| 7,598,686 B2 | 10/2009 | Lys et al. | |
| 7,692,111 B1 | 4/2010 | Rosing et al. | |
| 7,710,369 B2 | 5/2010 | Dowling | |
| 7,712,910 B2 | 5/2010 | Ng et al. | |
| 7,750,282 B2* | 7/2010 | Mahowald et al. | 250/214 AL |
| 7,750,352 B2 | 7/2010 | Thurk | |
| 7,778,590 B2 | 8/2010 | Kogo | |
| 7,825,907 B2 | 11/2010 | Choo et al. | |
| 7,825,917 B2* | 11/2010 | Bryant et al. | 345/207 |
| 7,863,822 B2 | 1/2011 | Stoschek et al. | |
| 7,880,131 B2 | 2/2011 | Andre et al. | |
| 7,960,682 B2* | 6/2011 | Gardner, Jr. | 250/225 |
| 8,017,216 B2 | 9/2011 | Kato et al. | |
| 8,018,170 B2 | 9/2011 | Chen et al. | |
| 8,080,753 B2 | 12/2011 | Yeh et al. | |
| 8,160,562 B2 | 4/2012 | Yuki et al. | |
| 8,174,304 B2 | 5/2012 | Cheng et al. | |
| 8,217,285 B2 | 7/2012 | Chang | |
| 8,217,887 B2 | 7/2012 | Sangam et al. | |
| 8,232,958 B2 | 7/2012 | Tolbert | |
| 8,247,714 B2 | 8/2012 | Tsai | |
| 8,282,261 B2 | 10/2012 | Pance et al. | |
| 8,303,151 B2 | 11/2012 | Pance et al. | |
| 8,373,355 B2 | 2/2013 | Hoover | |
| 8,378,857 B2 | 2/2013 | Pance et al. | |
| 8,378,972 B2 | 2/2013 | Pance et al. | |
| 8,785,796 B2 | 7/2014 | Bronstein et al. | |
| 2001/0053082 A1 | 12/2001 | Chipalkatti et al. | |
| 2003/0043589 A1 | 3/2003 | Blank | |
| 2003/0174072 A1 | 9/2003 | Salomon | |
| 2003/0210221 A1* | 11/2003 | Aleksic | 345/102 |
| 2003/0234342 A1* | 12/2003 | Gaines et al. | 250/205 |
| 2004/0032745 A1* | 2/2004 | Pederson | 362/545 |
| 2004/0195494 A1 | 10/2004 | Kok et al. | |
| 2004/0204190 A1 | 10/2004 | Dietrich et al. | |
| 2004/0230912 A1 | 11/2004 | Clow et al. | |
| 2004/0238195 A1 | 12/2004 | Thompson | |
| 2004/0239618 A1 | 12/2004 | Kim | |
| 2005/0030203 A1* | 2/2005 | Sharp et al. | 340/907 |
| 2005/0073446 A1 | 4/2005 | Lazaridis et al. | |
| 2006/0022951 A1 | 2/2006 | Hull | |
| 2006/0033443 A1 | 2/2006 | Ishii et al. | |
| 2006/0042820 A1 | 3/2006 | Lin et al. | |
| 2006/0145887 A1* | 7/2006 | McMahon | 340/815.45 |
| 2006/0158353 A1 | 7/2006 | Tseng | |
| 2006/0227085 A1* | 10/2006 | Boldt et al. | 345/83 |
| 2007/0046646 A1 | 3/2007 | Kwon et al. | |
| 2007/0090962 A1 | 4/2007 | Price et al. | |
| 2008/0001787 A1 | 1/2008 | Smith et al. | |
| 2008/0111500 A1 | 5/2008 | Hoover et al. | |
| 2008/0127537 A1 | 6/2008 | Boisseau | |
| 2008/0143560 A1 | 6/2008 | Shipman | |
| 2008/0166006 A1 | 7/2008 | Hankey et al. | |
| 2008/0179497 A1* | 7/2008 | Maniam et al. | 250/214 AL |
| 2008/0265131 A1* | 10/2008 | Tsai | 250/206 |
| 2008/0291159 A1 | 11/2008 | Wang | |
| 2008/0303918 A1 | 12/2008 | Keithley | |
| 2009/0135142 A1 | 5/2009 | Fu et al. | |
| 2009/0173533 A1 | 7/2009 | Brock et al. | |
| 2009/0173534 A1 | 7/2009 | Keiper et al. | |
| 2009/0176391 A1 | 7/2009 | Brock et al. | |
| 2009/0201179 A1 | 8/2009 | Shipman et al. | |
| 2009/0277763 A1 | 11/2009 | Kyowski et al. | |
| 2010/0008030 A1 | 1/2010 | Weber et al. | |
| 2010/0044067 A1 | 2/2010 | Wong et al. | |
| 2010/0238120 A1 | 9/2010 | Hsieh | |
| 2010/0265181 A1 | 10/2010 | Shore | |
| 2010/0300856 A1 | 12/2010 | Pance et al. | |
| 2010/0302169 A1 | 12/2010 | Pance et al. | |
| 2010/0306683 A1 | 12/2010 | Pance et al. | |
| 2011/0280042 A1 | 11/2011 | Pance et al. | |
| 2011/0304485 A1 | 12/2011 | Mahowald et al. | |
| 2012/0012448 A1 | 1/2012 | Pance et al. | |
| 2012/0013490 A1 | 1/2012 | Pance | |
| 2012/0262940 A1 | 10/2012 | Miyairi et al. | |
| 2013/0093330 A1 | 4/2013 | Pance | |
| 2013/0163223 A1 | 6/2013 | Pance | |
| 2013/0201111 A1 | 8/2013 | Pance et al. | |
| 2013/0256108 A1 | 10/2013 | Mahowald et al. | |
| 2014/0225835 A1 | 8/2014 | Pance et al. | |

FOREIGN PATENT DOCUMENTS

| | | |
|---|---|---|
| EP | 1881513 | 1/2008 |
| EP | 2017694 | 1/2009 |
| GB | 2431001 | 4/2007 |
| JP | 60004094 | 1/1985 |
| JP | 04212289 | 8/1992 |
| JP | 04324294 | 11/1992 |
| JP | 05238309 | 9/1993 |
| JP | 06251889 | 9/1994 |
| JP | 06318050 | 11/1994 |
| JP | 07014694 | 1/1995 |
| JP | 10073865 | 3/1998 |
| JP | 2000098942 | 4/2000 |
| JP | 3106701 | 11/2004 |
| JP | 2005032470 | 2/2005 |
| JP | 2005293853 | 10/2005 |
| JP | 2006041043 | 2/2006 |
| KR | 10-2008-0102954 | 11/2008 |
| WO | WO2007/002796 | 1/2007 |
| WO | WO2007/102633 | 9/2007 |
| WO | WO2009/136929 | 11/2009 |

OTHER PUBLICATIONS

Author Unknown, "Long Polymers Light Up LEDs," Physicsweb.org, http://www.physicsweb.org/articles/news/6/4/22/1, at least as early as Apr. 30, 2002.

Author Unknown, "Optimus Keyboard," Art.Lebedev Studio, http://www.artlebedev.com/portfolio/optimus/, at least as early as Dec. 1, 2005.

Author Unknown, "Optimus OLED Keyboard," Gizmodo: The Gadgets Weblog, http://www.gizmodo.com/gadgets/peripherals/input/optimus-oled-keyboard-112517.php, at least as early as Dec. 1, 2005.

Author Unknown, "Optimus OLED Keyboard with Customizable Layout," Gear Live, http://www.gearlive.com/index.php/news-ar-

(56) References Cited

OTHER PUBLICATIONS ticle/optimus_oled_keyboard_07131058/, at least as early as Dec. 1, 2005.

Author Unknown, "Optimus Russian Keyboard," Primo Tech, http://www.primotechnology.com/index.php?art+articles/0705/optimus/index.htm, at least as early as Dec. 1, 2005.

Author Unknown, "Organic Light-Emitting Diode," Wikipedia.com, http://en.wikipedia.org/wiki/OLED, at least as early as Dec. 1, 2005.

Author Unknown, "Organic Polymers to Precede Nano Semi," EETimes.com, http://www.eet.com/story/OEG20030923S0055, at least as early as Dec. 1, 2005.

Author Unknown, "How, Why & Where to Use Self-Clinching Fasteners," PennEngineering, http://www.pemnet.com/fastening_products/about_self_clinching/index.html, 2 pages, at least as early as Dec. 21, 2011.

Author Unknown, "Physics News Update," American Institute of Physics, http://www.aip.org/pnu/1993/split/pnu1148-3.htm, Oct. 19, 1993.

Author Unknown, "Polymer Light-Emitting Diodes," Philips Research—Technologies, http://www.research.philips.com/technologies/display/polyled/polyled/, at least as early as Dec. 1, 2005.

Author Unknown, "What is OLED (Organic Light Emitting Diode)?," WiseGeek.com, http://www.wisegeek.com/what-is-an-oled.htm?referrer+adwords_campaign=oled_ad=024 . . . , at least as early as Dec. 1, 2005.

Author Unknown, "What is PLED?—A Word Definition from the Webopedia Computer Dictionary," http://www.webopedia.com/TERM/P/PLED/html, at least as early as Dec. 1, 2005.

Braun et al., "Transient Repsonse of Passive Matrix Polymer LED Displays," http://www.ee.calpoly.edu/~dbraun/papers/ICSM2000BraunEricksonK177.html, at least as early as Dec. 1, 2005.

Rojas, "Optimus Keyboard Trumped by the Display Keyboard?," http://www.engadget.com/2005/07/29/optimus-keyboard-trumped-by-the-display-keyboard/, Jul. 29, 2005.

* cited by examiner

LIGHT SOURCE WITH LIGHT SENSOR

CROSS-REFERENCE TO RELATED PATENT APPLICATIONS

The following related patent applications are hereby incorporated by reference in their entirety as if set forth fully herein: U.S. patent application Ser. No. 12/476,000, titled "Keyboard With Increased Control of Backlit Keys" and filed concurrently herewith; U.S. patent application Ser. No. 12/476,040, titled "User Interface Behaviors For Input Device with Individually Controlled Illuminated Input Elements" and filed concurrently herewith; and U.S. patent application Ser. No. 12/475,993, titled "White Point Adjustment For Multicolor Keyboard Backlight" and filed concurrently herewith.

BACKGROUND

1. Technical Field

The present invention relates generally to light sources and, more particularly, to light sources with light sensors.

2. Background Discussion

Most electronic devices, such as computers, DVD players, DVRs, televisions, surround sound receivers, etc. have lighting elements to illuminate certain parts of the device. For example, many devices have status indicator lights that may indicate that the device is powered on, communicating with another device or performing a particular function, among other things. Typically the indicator lights are light emitting diodes (LEDs) that are typically only operated in two modes: on or off. Generally, when on, the LEDs provide a high level of luminance. In some ambient lighting conditions, the level of luminance may be distracting or inadequate. For example, if the electronic device is located in a bedroom, a bright indicator light may make it difficult to sleep. Additionally, if the electronic device is located near a television or a projection screen, the indicator light may distract from content being displayed on the television of projections screen, particularly if the room is darkened.

SUMMARY

Certain embodiments may take the form of systems, devices and/or methods for operating a light source to provide a desired light output. In particular, in one embodiment, a light control system includes a light source and a light sensor. The light source and light sensor share a common light pathway. Additionally, the light control system includes a controller electrically coupled to the light source and the light sensor that operates the light source and the light sensor alternatively during a periodic cycle having a frequency of approximately 60 Hz or greater.

Another embodiment is a method of operating a lighting system. The method includes periodically actuating a light source during a first portion of a periodic control signal operating at 60 Hz or greater. A light sensor shares the same light pathway with the light source and is actuated during second portion of the control signal to determine ambient lighting conditions.

Yet another embodiment is a method of manufacturing a lighting system that includes measuring ambient light conditions and adjusting a light output by one or more light sources to provide a desired visual effect for the corresponding measured ambient light conditions. A calibration table is generated that includes the measured ambient light conditions and the corresponding adjusted light output. A device is then programmed to operatively determine ambient light conditions and actuate light sources to provide the light output that corresponds to the determined ambient light conditions based on the data in the calibration table.

DETAILED DESCRIPTION

Generally, one embodiment takes the form of a system for operating one or more light sources to produce a desired visual effect based on the amount of ambient light to which the one or more light sources are exposed. The system includes one or more light sensors proximately located to the one or more light sources so that the light sensors share the same optical path as the light sources. A microcontroller time division multiplexes (TDM) the light sensor and the light source such that the light sensors are not influenced by light emitted by the light sources. Thus, the light sensors sense ambient light to determine the operating conditions of the light source. The controller adjusts the output of the light sources according to determined ambient conditions in which the light sources are operating to create the desired visual effect.

The visual effects may generally include adjusting the brightness and/or color of light output by the light source. In particular, the visual effects may include dynamic transitions such that as the ambient light change due to time of day, presence of light sources, shadows, indoor/outdoor locations, etc., color and intensity of the output light changes. For example, the output light may be adjusted to match the effects of the ambient light. That is, if the ambient light increases in brightness and turns a reddish hue, the output light may correspondingly increase in intensity and turn a reddish hue, for example. In an alternative embodiment, the light output may counter the ambient light such that if the ambient light becomes brighter and turns a reddish hue, the light output may dim and turn a greenish hue, for example. Several different algorithms, such as transitions and fade in/out based on linear, multi-linear, logarithmic or power laws, may be implemented to accomplish the dynamic changes. Examples of the various transition algorithms may be found in U.S. patent application Ser. No. 12/251,186, titled: Color Correction of Electronic Displays" and filed on Oct. 14, 2008, which is incorporated herein by reference in its entirety and for all purposes.

Figure 1:
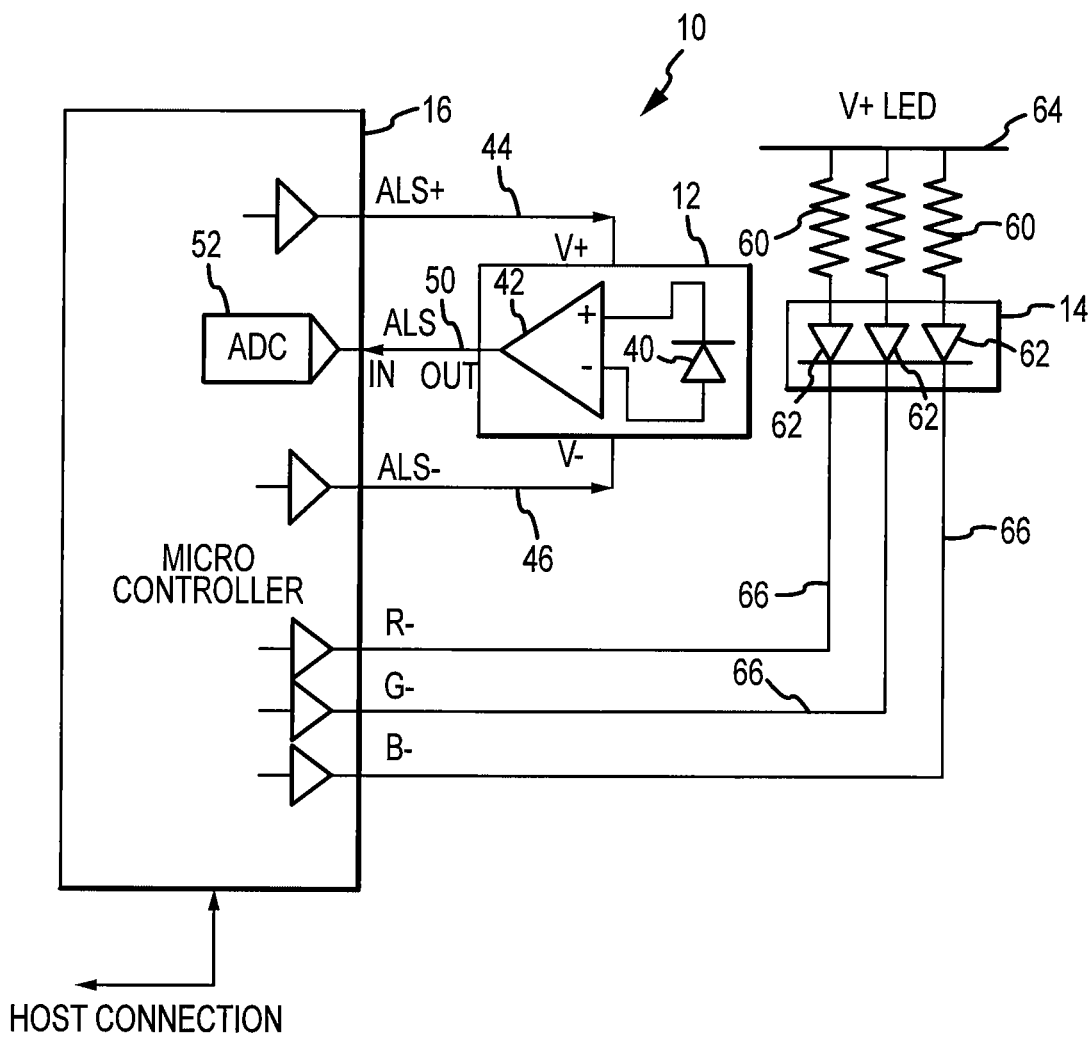
FIG. 1 is a block diagram of a light control system.

Turning to the figures and initially referring to FIG. 1, a block diagram for an embodiment of a lighting system 10 having a light sensor 12 and a light source 14 coupled to a controller 16 is illustrated. The controller 16 may be any microcontroller suitable for actuation of the light sensor 12 and the light source 14 in a pulse-width modulation manner. For example, in some embodiments, the controller 16 may be a model 8742 manufactured by Intel Corporation, or a PIC16F84 manufactured by Microchip, Inc. In other embodiments, the controller 16 may be part of a larger integrated circuit, such as a microprocessor capable of running in either master or slave modes. In yet another embodiment, the controller 16 may be a multi-channel LED driver with precise current setting and matching across all LED's being driven. In the multi-channel LED driver embodiment, the LED's would be driven with low-side field effect transistors (FET) internal to the controller 16 and the resistors 60 would not be used. Examples of multi-channel LED drivers include Linear LTC3220 or Ti TLC5940.

Figure 2:
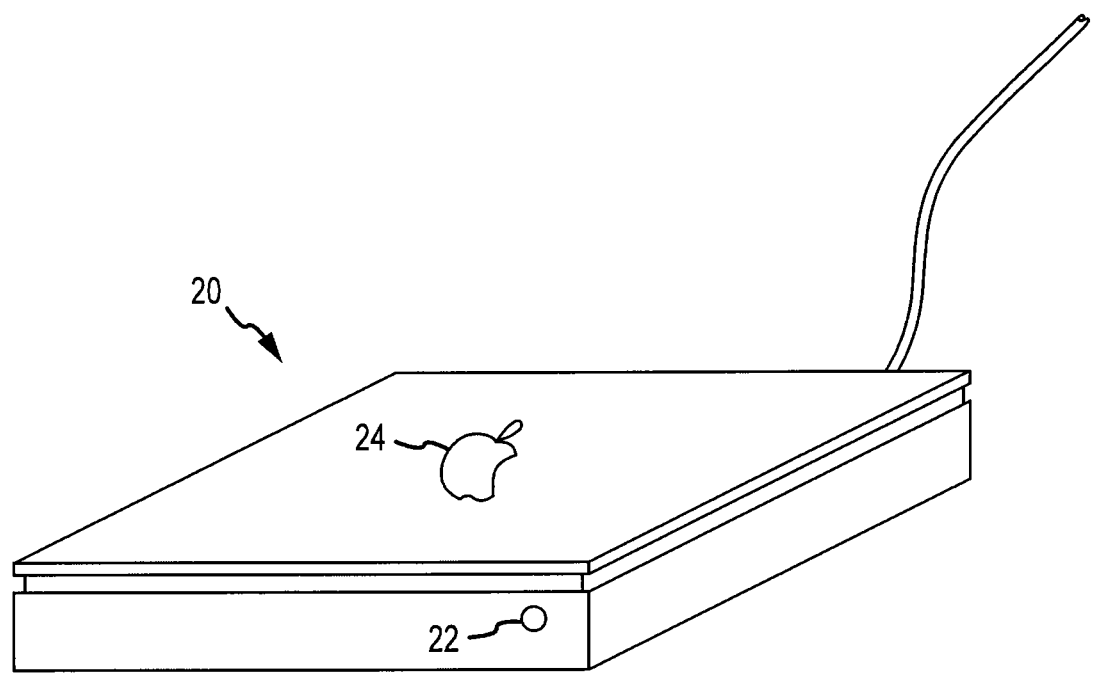
FIG. 2 illustrates a network switch that may operate as a host for the light control system in accordance with an embodiment.

In one embodiment, the controller 16 may be coupled to a CPU of a host device. The host may be any device that implements lighting effects. Examples of possible hosts include, but is not limited to televisions, computers, VCRs, DVD players, BluRay Disc players, DVRs, network switches, etc. For example, FIG. 2 illustrates a network switch 20 that includes a status light 22 that illuminates to indicate the status of the network switch 20. For example, the status light 22 may illuminate to a green color to indicate that the switch 20 is powered on and operating normally. Other colors may indicate different stages of operation, i.e. yellow to indicate starting up, or may blink to indicate other states of operation for the switch 20. Additionally, other parts of the switch 20 may be illuminated. For example, a surface or a surface containing a mark, such as mark 24 may be illuminated in accordance with the techniques disclosed herein to achieve a desired visual effect.

Figure 3A:
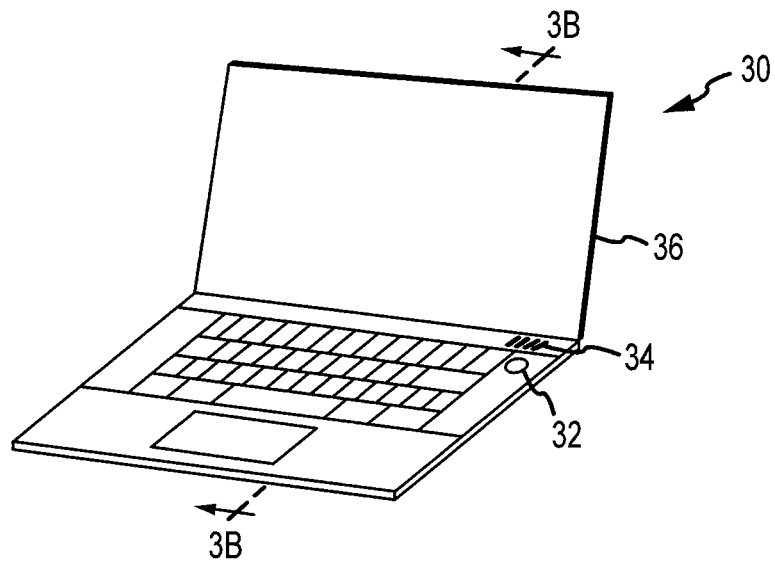
FIGS. 3A and 3B illustrate a portable computing device in accordance with an alternative embodiment.
Figure 3B:
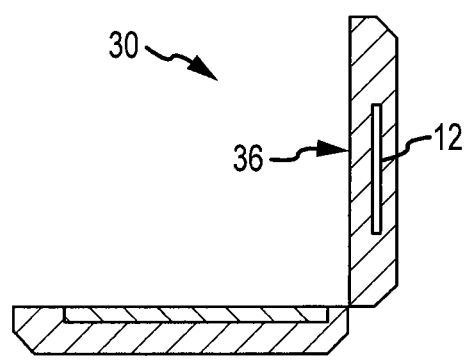

In another example embodiment, the lighting system 10 of FIG. 1 may be implemented in a portable computing device 30 as illustrated in FIGS. 3A-3B. Specifically, the lighting system 10 may be used to control the illumination of various status indicators, buttons, surfaces, etc., of the portable computing device 30, including a power button 32 or battery power indicators 34. Additionally, the lighting system 10 may be integrated into the display 36 of the portable computing device 30 to control the color and intensity of the display 36 or other light source of the computing device 30. In particular, the light sensor 12 may be located behind the display 36 and may be actuated alternately with the display 34 so that the ambient conditions in which the display 36 is operating may be determined and the display 36 or other light source may be operated to provide a desired visual effect. As such, in one embodiment, the light source 14 may represent the display 36 of the computing device 30.

Referring again to FIG. 1, the illustrated light sensor 12 includes a photodiode 40 with an amplifier 42. A positive and negative rail voltage 44 and 46, respectively, may be supplied to the light sensor 12 from the controller 16 for the operation of the amplifier 42. An output 50 of the light sensor 12 is coupled to an analog-to-digital converter (ADC) 52 that may be part of the controller 16. The ADC 52 converts analog signals generated by the light sensor 12 into a digital signal to be processed and/or interpreted by the controller 16 or a host. For example, the controller 16 may receive a converted digital signal and determine the brightness of ambient light in which the multicolored light source 14 is operating. The controller 16 may then adjust the output of the light source 14 to achieve a desired visual effect according to ambient light conditions that are determined in real time. Stated differently, the controller 16 may dynamically adjust the light output (both intensity and color) based on current lighting conditions in which a light source is operating.

In particular, each anode 60 of LEDs 62 in the light source 14 may be coupled to a common supply voltage 64, while each cathode 66 is independently coupled to buffers 68 within the controller 16. Thus, each of the LEDs 62 may be independently actuated to achieve a desired color and brightness. The controller 16 may be configured to operate the LEDs 62 according to a particular lighting and/or coloring scheme. In one embodiment, the controller 16 may be configured to follow a programmed color and lighting scheme.

Figure 4A:
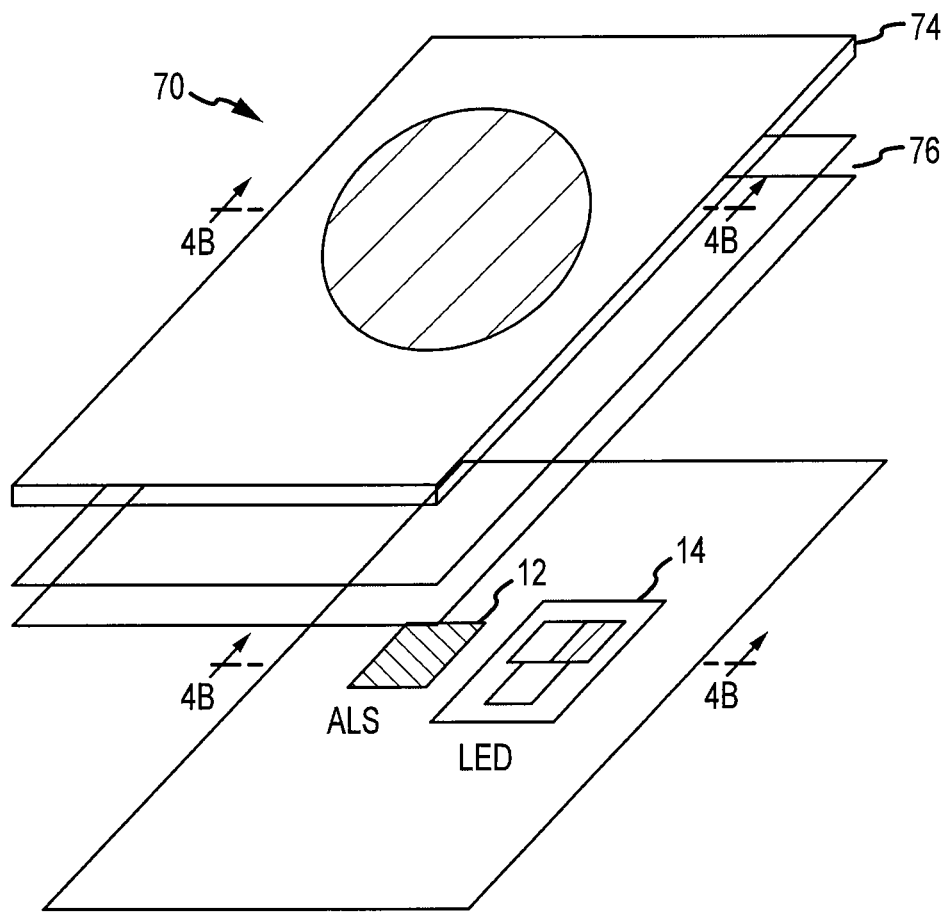
FIGS. 4A and 4B illustrate a light sensor and light source package in accordance with an embodiment.
Figure 4B:
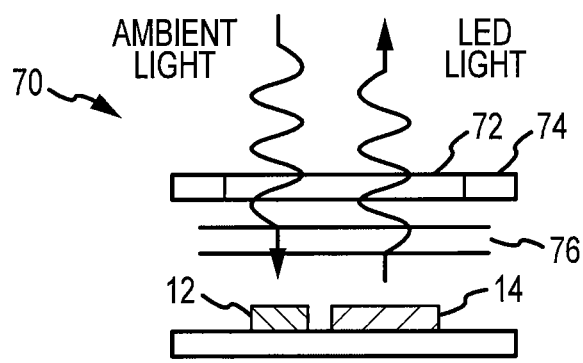

FIGS. 4A-4B illustrate an expanded view of a block diagram of the light source 14 and light sensor 12 in accordance with an embodiment. In particular, the light source 14 and light sensor 12 are included in a single package 70 ("package") in FIGS. 4A-4B. The light sensor 12 may include a photodiode, a phototransistor, an integrated phototransistor and amplifier, or any other suitable photo-sensitive device. Additionally, in some embodiments, more than one light sensor 12 may be integrated into the package 70. For example, in one embodiment, multiple narrowband light sensors may be integrated into the package 70 and each light sensor may be sensitive in a different portion of the visible light spectrum. In one embodiment, three narrowband light sensors may be integrated into a single package: a first light sensor may be sensitive to light in the red region of the electromagnetic spectrum, a second light sensor may be sensitive in a blue region of the electromagnetic spectrum, and a third light sensor may be sensitive in the green portion of the electromagnetic spectrum, for example. The sensing frequencies of each narrowband sensor may also partially overlap, or nearly overlap, that of another narrowband light sensor. In other embodiments, one or more broadband light sensors (not shown) may be integrated into the package 70. Each of the broadband light sensors may be sensitive to light throughout the spectrum of visible light. The light may be filtered to determine the intensity of light at particular wavelengths or within certain wavelength ranges.

The light source 14 may be any suitable light source, including incandescent light, light emitting diodes (LED), organic LEDs, solid-state lighting devices, etc. Additionally, the light source 14 may include more than one light source so that the light source 14 may generate a desired visual effect. In some embodiments, the light source 14 may include a multi-color LED. For example, the light source 14 may be a top firing red, green and blue (RGB) LED that emits red, green and blue light.

The light emitted from the light source 14 and the light sensed by the light sensor 12 may pass through a clear opening 72 or an aperture in a cover 74 of the package 70. Additionally, the package 70 may include other layers 76 to diffuse, mix or shape the light. Specifically, for example, the layers 76 may include light guides, lenses, filters, holographic diffusers, etc. Such devices are known in the art and may implemented to achieve a desired effect. In some embodiments, for example, the lenses, light guides, filters, holographic diffusers may be made of glass or plastic, such as acrylic plastic.

FIG. 4B is a cross-sectional view of the package 70. As illustrated, the light sensor 12 and the light source 14 may be co-located or located in close proximity to each other and may be configured to receive and emit light, respectively, in the same light path. This allows the light sensor 12 to sense the same or approximately the same ambient light as that to which the light source 14 is exposed. Hence, the light sensor 12 may be used to determine the ambient light conditions in which the light source 14 is operating.

Figure 5A:
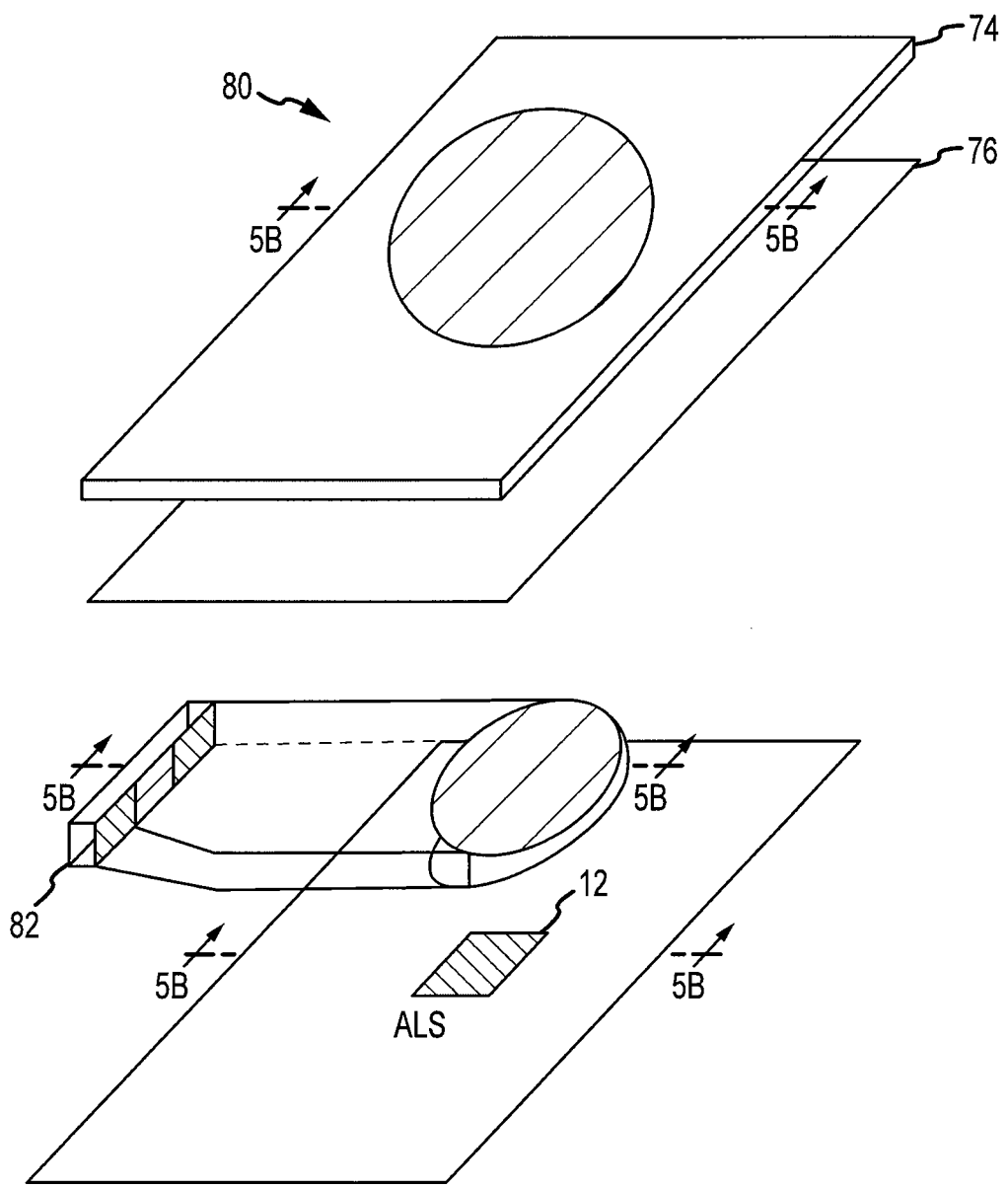
FIGS. 5A and 5B illustrate a light sensor and light source package in accordance with an alternative embodiment.
Figure 5B:
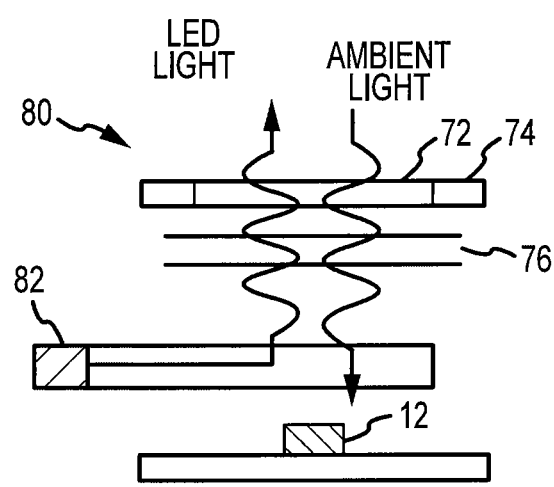

FIGS. 5A-5B illustrate a light source and light sensor package 80 in accordance with an alternative embodiment. In particular, whereas the embodiment illustrated in FIG. 4A shows a top-firing LED, package 80 of FIG. 5A includes a side-firing LED 82. The use of the side-firing LED 82 may allow the light sensor 12 to be positioned in a plane below the plane in which the side firing LED 82 operates an receive light through an aperture through which light from the LED 82 exits the package 80, as can be seen in the cross sectional view shown in FIG. 5B. As with the light source 14, the side-firing LED 82 may include one or more LEDs, and/or may emit light having one or more colors of the visible light spectrum.

Although both top-firing and side-firing LEDs have been discussed and shown in the figures, it should be understood that they are provided as examples of potential light sources and other light sources may be possible and/or desirable. Additionally, while the light sources and the light sensors have been described as being combined in single packages 70 and 80, it should be understood that the light sources 14 and light sensors 12 may be packaged separately but co-located so that a common window is used for receiving light at the light sensor and for light emitting from the light source. As such, each of the following described embodiments may be implemented with top-firing LEDs, side-firing LEDs, or any other suitable light source and the light sources and light sensors may be packaged together or otherwise co-located. Additionally, in some embodiments, the light sources 14 and light sensors 12 may be spatially separated, i.e., not co-located.

One possible visual effect that may be produced may be referred to as "constant contrast ratio" illumination. Constant contrast ratio illumination refers to adjusting the brightness of the light source 14 such that in particular ambient light conditions the window 72 or part of a surface that is illuminated by the light source 14 appears to have the same brightness as a surrounding non-illuminated surface, thereby making the illuminated window 72, or part of the surface, appear as if it is painted or printed on a surrounding surface, rather than illuminated. Thus, the light source 14 does not appear to be glowing.

Figure 6:
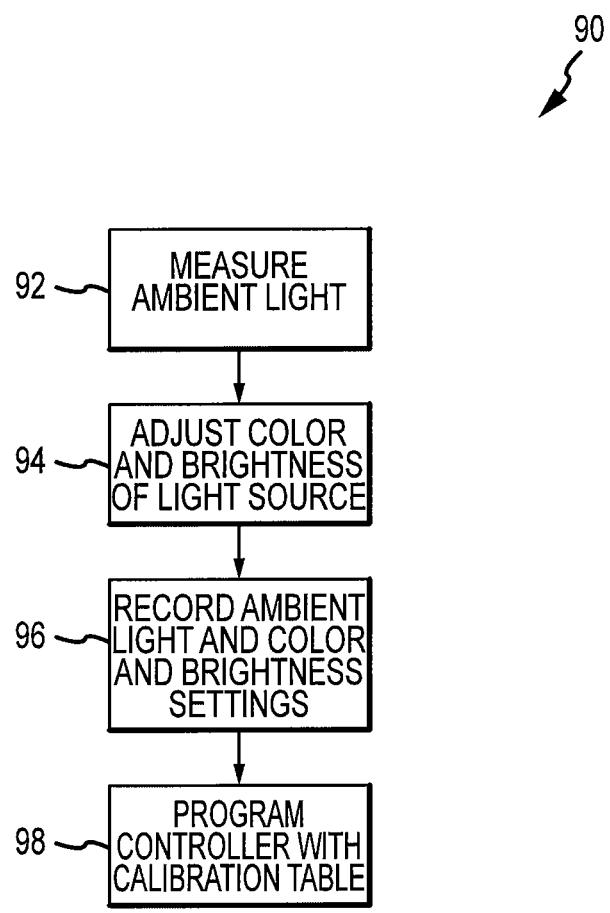
FIG. 6 is a flowchart illustrating a process for calibrating the operation of a light control system in accordance with an embodiment.

In order to achieve this effect, a calibration may be performed. FIG. 6 illustrates a flowchart representing the calibration process 90. The process 90 begins by measuring ambient light with the ambient light sensor 12 (operation 92). Multiple measurements may be taken throughout a range of operating conditions to obtain a representative data sets. The process continues by adjusting the color and brightness of the light source to achieve the close resemblance to a reference surface, such as the surface of the device near the window 72, for example (operation 94). The ambient light conditions and the corresponding output brightness and color are then recorded into a calibration table (operation 96). Different calibration tables may be recorded for particular sets of ambient light conditions and desired visual effects. Additionally, where multiple colors are used, the setting of each color is recorded independently so that the desired effect may be reproduced. After calibration tables are generated, the calibration table may be programmed into the controller 20 and the controller 20 is programmed to use the calibration table for driving the LEDs to an corresponding brightness and color output based on a determined ambient light (operation 98). One of many possible interpolation algorithms, i.e., linear, logarithmic, exponential, etc., may be used to determine an appropriate output for ambient lighting that does not correspond directly to points of the calibration table.

Figure 7:
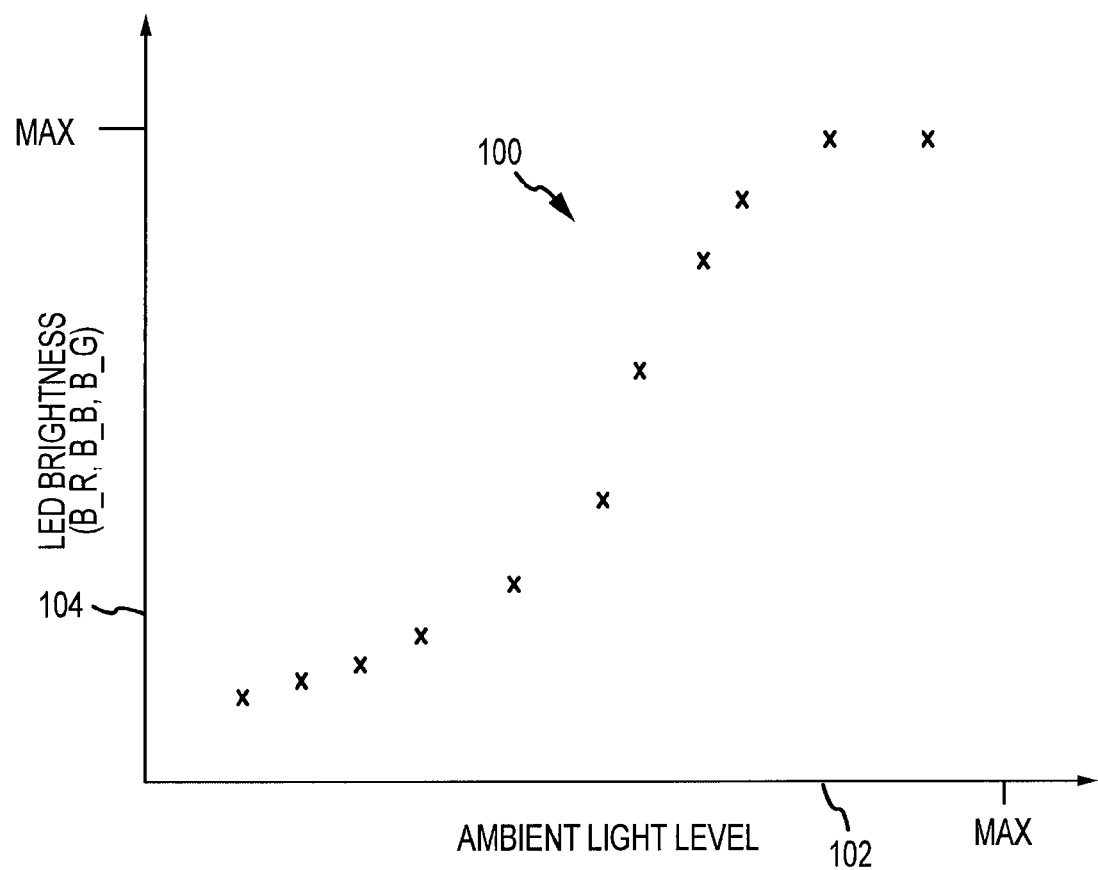
FIG. 7 is a plot illustrating a transition curve for light output relative to a determined level of ambient light.

FIG. 7 illustrates a plot 100 of example data points (shown as "x") of a calibration table. The horizontal axis 102 represents an ambient light level having a scale relative to a maximum level that may be detected. The vertical axis 104 represents the brightness of the light sources relative to a maximum brightness level. Each data point is generated by determining the ambient light level and then determining an appropriate brightness and color level for the light source to achieve the desired effect, such as constant contrast ratio, for example. As the light source 14 may include more than one color and as each color may be independently controlled to achieve a desired color and brightness output, there may be multiple points, each having a unique brightness and color, for each level of ambient light. Once sufficient data points have been collected to establish a range of data from a minimum to a maximum ambient light level with each point offset from its neighbors by no more than a maximum allowable interval, the data points may be programmed into a controller so that the controller may operate the light sources according to the desired visual effect based on the determined amount of ambient light.

In order to operate light source 14 in close proximity with the light sensor 12 without the light sensor 12 being influenced by the output of the light source 14, a time division multiplexing (TDM) scheme is implemented by the controller 16 to operate the light sensor 12 and the light source 14. Additionally, a pulse width modulation (PWM) scheme may be implemented to allow the controller 16 to control the brightness and color output of the light source 14, as discussed below.

Figure 8:
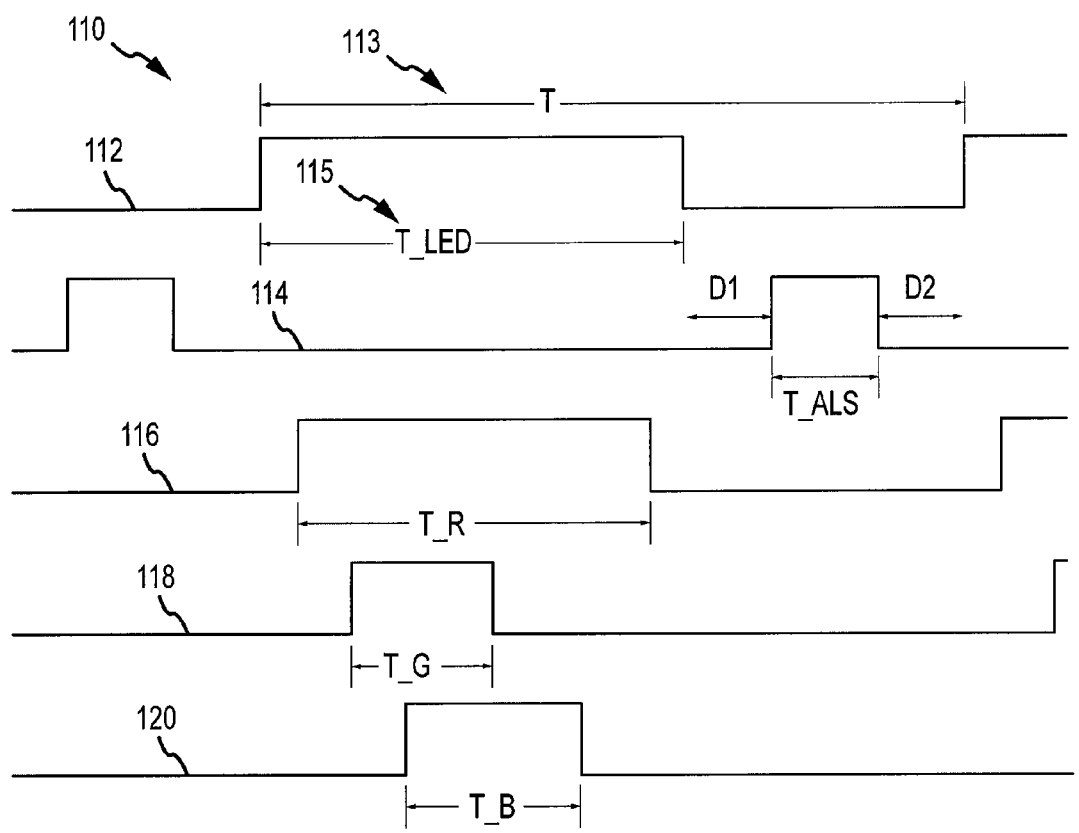
FIG. 8 is a timing diagram for time division multiplexing actuation of a light sensor and a light source and also illustrates pulse width modulation of the light source to adjust the color and brightness output by a light source.

FIG. 8 is a timing diagram 110 showing an example TDM and PWM scheme that may be implemented by the controller 16 to allow for sequential operation of the light source 14 and light sensor 12 in close proximity of each other. A first line 112 located at the top of the diagram 110 illustrates the periodicity of the TDM scheme. In particular, a single cycle 113 (period T) in the TDM scheme may include a light source portion (T_LED) 115 and a light sensor portion. The light source portion (T_LED) 115 of the period T may be defined as the time when the top line 112 is high (e.g., in a digital system a "one" output) and during which the light source 14 may be actuated. That is, one or more of the individual LEDs 62 of the light source 14 may be actuated during the light source portion (T_LED) of the period T. Additionally, when the first line 112 is low (e.g., in a digital system a "zero" output) the light sensor may be actuated and, hence, may be defined as the light sensor portion of the period T. The length of time of the period T may be selected so that the human eye is unable to detect light flicker and the light source appears to be continuously actuated. For example, the frequency (1/T) may be approximately 60 Hz or greater, although other embodiments may have lower frequencies such as 55 Hz or even lower.

The second line 114 in the timing diagram 110 corresponds to actuation of the light sensor 12. The light sensor 12 is actuated during the light sensor portion of the period T and when the second line 114 is high, i.e., during time T_ALS. As can be seen, the light sensor 12 is not actuated for the entire light sensor portion of the period T. Specifically, there is a delay D1 between the beginning of the light sensor portion of the period T and actuation of the light sensor 12. Similarly, there is a delay D2 between de-actuation of the light sensor 12 and the beginning of the light source portion T_LED of the period T. The delays D1 and D2 may result from latency between the time a command is issued from the controller to when the sensor is fully operative and additionally may allow for the light emitted from the light source 14 to disperse prior to actuation of the light sensor 12. Hence, the delays D1 and D2 may help to ensure that light emitted from the light source 14 does not influence the light sensor 12. The time allotted for the light sensor portion of the period T may be selected based upon the sensitivity of the light sensor being implemented and the response time of the light sensor, as well as the conversion speed of the ADC 52 of the controller 16. A maximum time for the light sensor (T_ALS) is chosen so that it is less than the period T minus the time required for light source actuation (T_LED) minus the time for the delays D1 and D2.

The third, fourth and fifth lines 116, 118, and 120 in the timing diagram illustrate the actuation of the LEDs 62. As can be seen, the actuation of each of the respective LEDs occurs during the light source portion (T_LED) of the period T. As each of the LEDs may be independently controlled, the LEDs may be actuated for different lengths of time and during different portions of the light source portion (T_LED) of the period T. The pulse width modulation of the light source, i.e., the length of time that a particular LED is actuated, determines the brightness of the light source 12 perceived by a viewer. The brightness of any given light source may be adjusted downward from 100 percent brightness based on the length of time the light source is actuated, where 100 percent brightness (or full brightness) is achieved by actuation of the light source for the entire light source portion (T_LED) of the period T. Therefore, if a particular LED is to be 75 percent of full brightness, for example, the length of time of actuation of that LED will be 75 percent of the light source portion (T_LED) of the period T.

In embodiments where the light source 14 includes more than one color emitter, such as a red, green and blue (RGB) LED, the actuation time of each LED can control the brightness, color scheme, and intensity of the light emitted by the light source 14. For example, in one embodiment the lines 116, 118 and 120 may represent a red LED (third line 116), a green LED (fourth line 118) and a blue LED (fifth line 120), respectively. In the illustrated example, the third line 116 represents a significantly longer actuation time than either fourth or fifth lines 118 and 120 and, as such, the light seen by a viewer may have a reddish hue.

Figure 9:
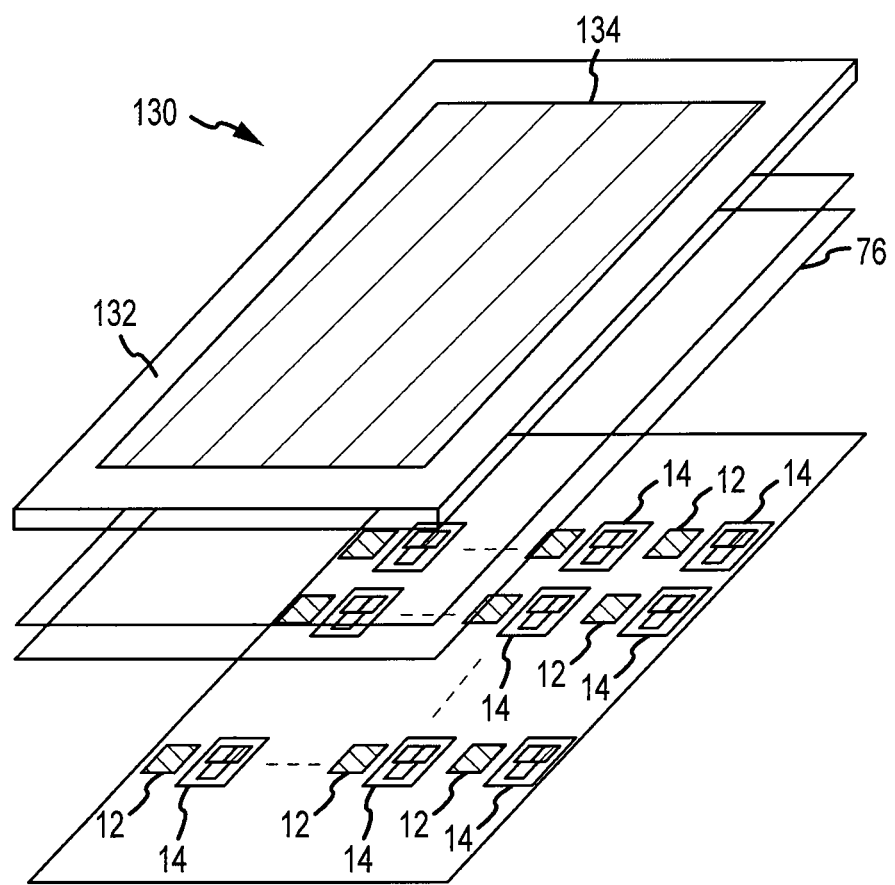
FIG. 9 illustrates a light source and light sensor array package in accordance with an alternative embodiment.

FIG. 9 illustrates implementation of an array 130 of light sources 14 and light sensors 12. The array 130 may be implemented to illuminate and provide visual effects to a larger surface than the previously described embodiments. Additionally, the array 130 may provide for a diverse field of visual effects based on the determined ambient light for the illuminated surface. As illustrated, the light sensors 12 and the light source 14 may be located under a single surface 132 that is to be illuminated. In one embodiment, the surface 132 may be entirely translucent. In other embodiments, the surface 132 may include a clear window 134 which may be illuminated or through which the light from the light sources 14 may shine. Additionally, as with other embodiments, other layers 76 may be used to diffuse, mix or shape the light. Specifically, for example, light guides, lenses, filters, holographic diffuses, etc. may be positioned between the surface 132 and the light sources 14 and light sensors 12. In one embodiment, the array 130 may be controlled by a single controller 16, as discussed above, to operate the light sources 14 and light sensors 12 in a TDM and PWM manner to achieve a desired effect. In an alternative embodiment, multiple controllers are implemented to operate the array 130, with each controller controlling a different number of light sources and/or light sensors.

Figure 10:
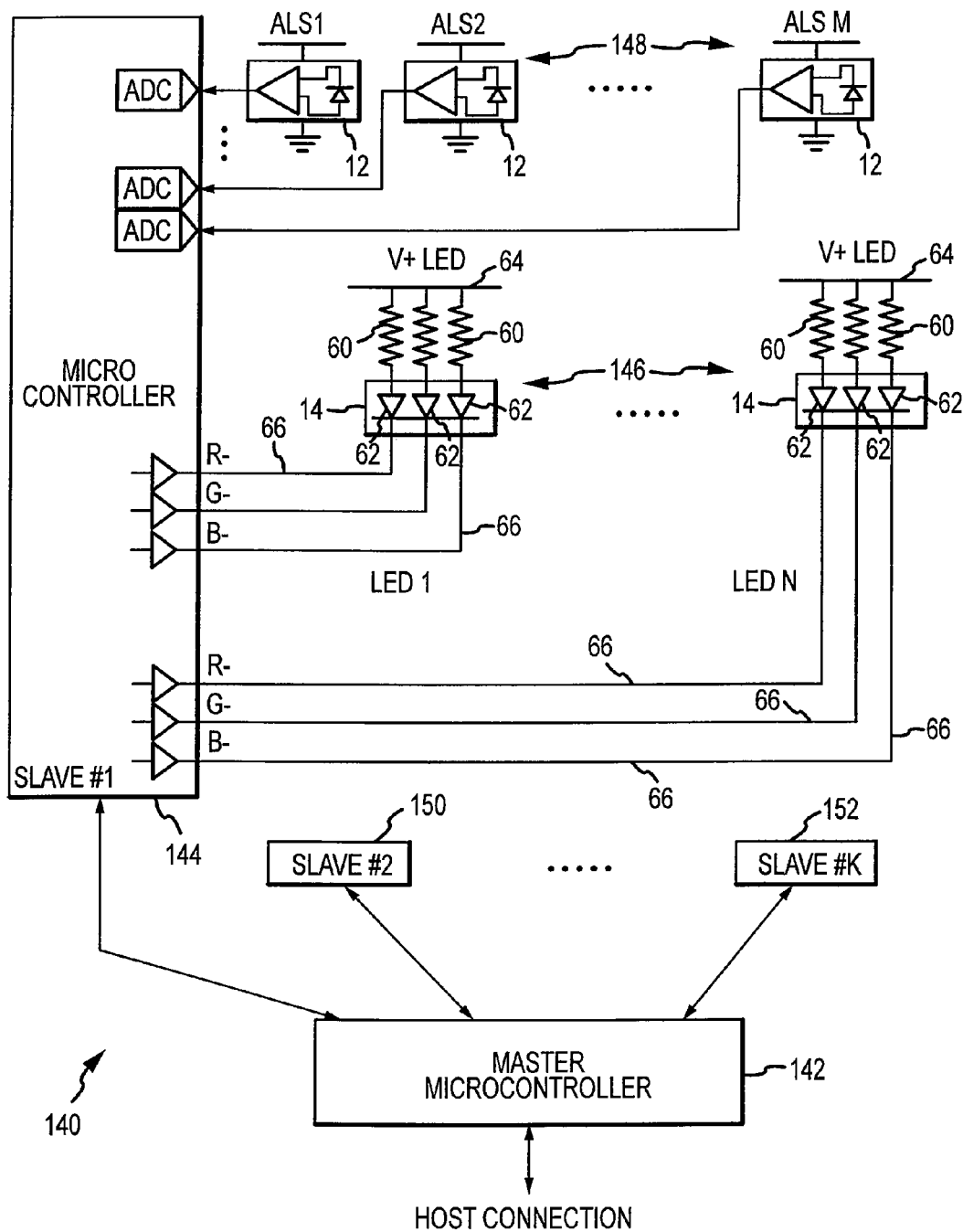
FIG. 10 is a schematic and block diagram illustrating a master and slave configuration for operating light sensor and light source arrays in accordance with an embodiment.

FIG. 10 illustrates a block diagram 140 of an embodiment having a master microcontroller 142 configured to control an arbitrary number K slave controllers in a master-slave configuration. For example, a slave controller 144 may control the actuation of N light sources 146 and M light sensors 148. In some embodiments, additional slave controllers 150 and 152 may control actuation of other arrays of light sources and light sensors (not shown). In other embodiments, the master controller 142 may also control an array of light sources and light sensors. Further, in yet other embodiments, there may be multiple "slave" controllers and no master controller 142. Rather, the multiple slave controllers may be programmed to act independently from the others and they each may receive a sync pulse (T_sync) from a simple timing circuit (not shown) or a clock generation circuit (not shown).

Several different arrangements are possible for arrayed light sensors and light sources. In general, N light sources and M ambient light sensors may be implemented for a particular application, where N and M may or may not be equal. For example, in one embodiment, there may be more light sources 146 than light sensors 148 and, as such, a single light sensor 12 may sense ambient light for more than one light source 14. In other embodiments, there may be the same number of light sensors 148 as light sources 146 or even more light sensors 148 than light sources 146. Additionally, in one embodiment, one controller may be dedicated to operating light sources and another controller may be dedicated to operating the light sensors.

The array 130 (FIG. 9) may be useful for providing a visual effect referred to as a "painted light surface" in which the constant contrast ratio effect is implemented across a larger surface. In the painted light surface embodiment, each light source 14 in the array of light sources 146 is coupled to one or more light sensors, which may be integrated with or separate from the light source 14. The light sources 14 may be placed underneath the surface 132 so that the light strikes the surface 132 when the light sources 12 are driven. The control of the light sources 146 may be calibrated so that a surface appears uniformly painted in a range of ambient light conditions, following the process set forth above with reference to FIG. 6. Specifically, the array 130 may be operated at different ambient lighting conditions and the light sources 14 individually may be adjusted so that the surface appears painted. The setting of the light sources 14 at the various ambient light settings may be recorded and used for reference when determining light source operation based on particular ambient lighting conditions.

The operation of the light sources 146 and the light sensors 148 of the array 130 is similar to that discussed above. In particular, each LED 62 of the light sources 146 may be individually controlled to provide a desired effect. In one embodiment, the anodes 60 of each of the LEDs 62 may be coupled together while the cathodes 66 of the LEDs 62 may be coupled independently to the controller 144. Hence, each of the LEDs 62 may be independently controlled by the controller 144. Additionally, each of the other controllers 150 and 152 may independently control light sources (not shown) to create a desired visual effect.

Figure 11:
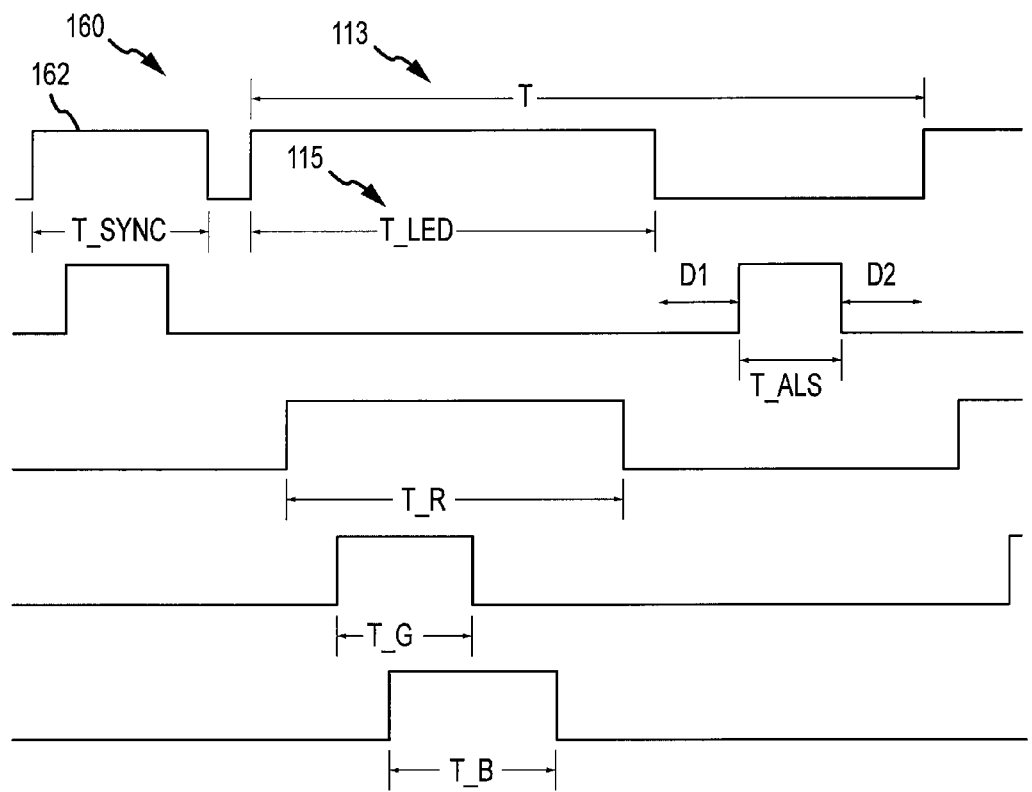
FIGS. 11 and 12 illustrate timing diagrams for the operation of the light source and light sensor arrays in a master and slave configuration in accordance with alternative embodiments.

The multiple controllers 144, 150 and 152, may be synchronized with a sync pulse. For example, FIG. 11 illustrates a timing diagram 160 for operating the controllers in a master/slave configuration, where the master controller 142 may control the operation of some light sources and/or light sensors. As shown in a first line 162, a sync pulse (T_sync) is included prior to the first period T. Upon receiving the synch pulse, each of the controllers 144, 150 and 152 may operate synchronously. The synchronization helps to prevent the light sensors 148 from being influenced by lights sources operated by any of the controllers.

Figure 12:
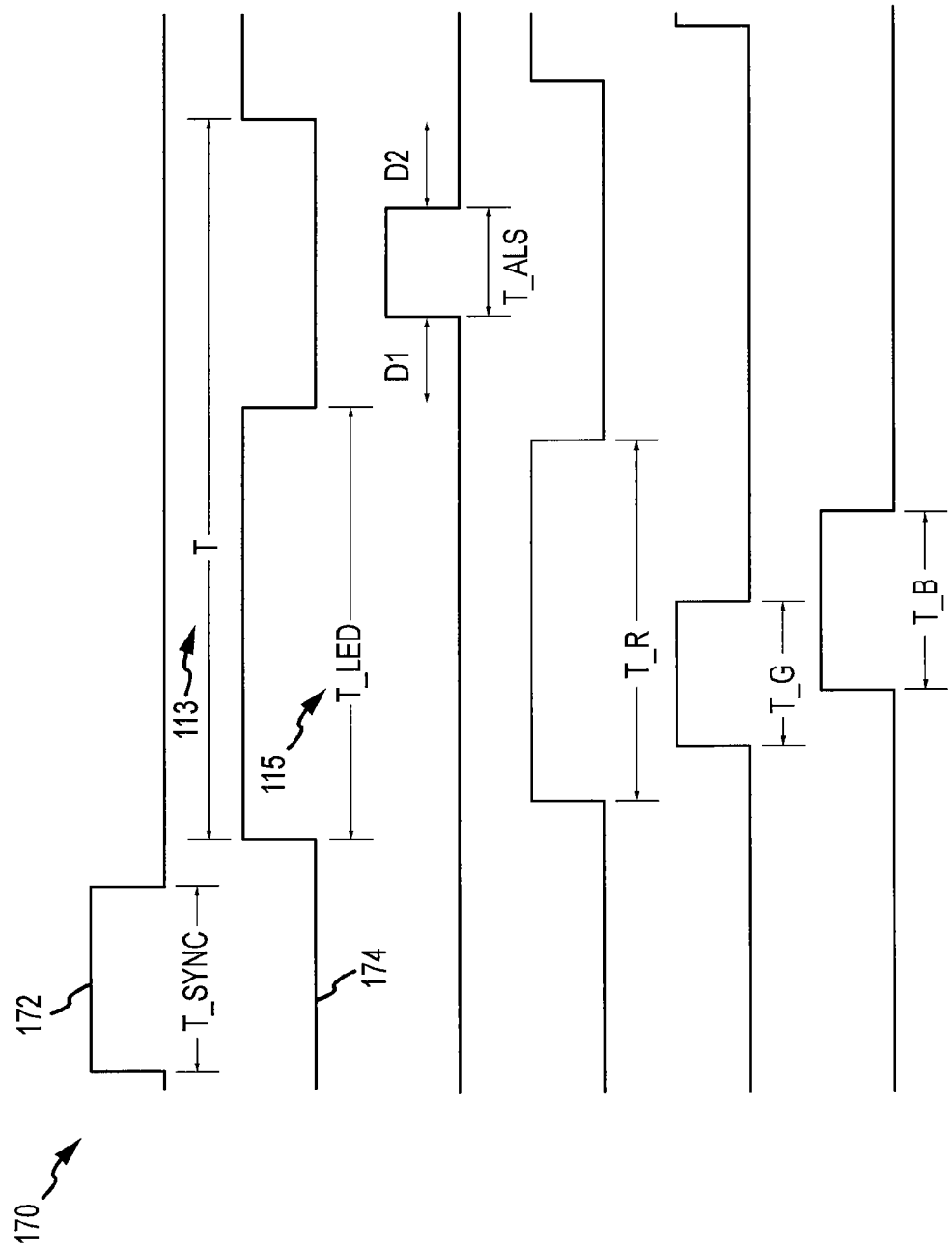

In addition to providing the T-sync signal, in one embodiment the master controller 142 may provide the period T to the slave controllers 144, 150 and 152. Alternatively, the slave controllers 144, 150 and 152 synchronize with the master controller 142 on either the up stroke or down stroke of T_sync and then provide their own periodic signal period T, as shown in FIG. 12. Specifically, FIG. 12 illustrates a timing diagram 170 in accordance with an alternative embodiment where T_sync, illustrated as the first line 172 in FIG. 12, is provided independent of the period T. The sync signal is provided by the master controller 142 and the period T (line 174) is provided by each of the slave controllers 144, 150 and 152. All of the other signals may operate as discussed above to achieve a desired effect. In an alternative embodiment, the sync pulse may be provided to the slave controllers 144, 150 and 152 by a simple timing circuit or clock generation circuit. Additionally, the slave controllers 144, 150 and 152 may be programmed to operate independently and, hence, the master controller may not be used.

Figure 13:
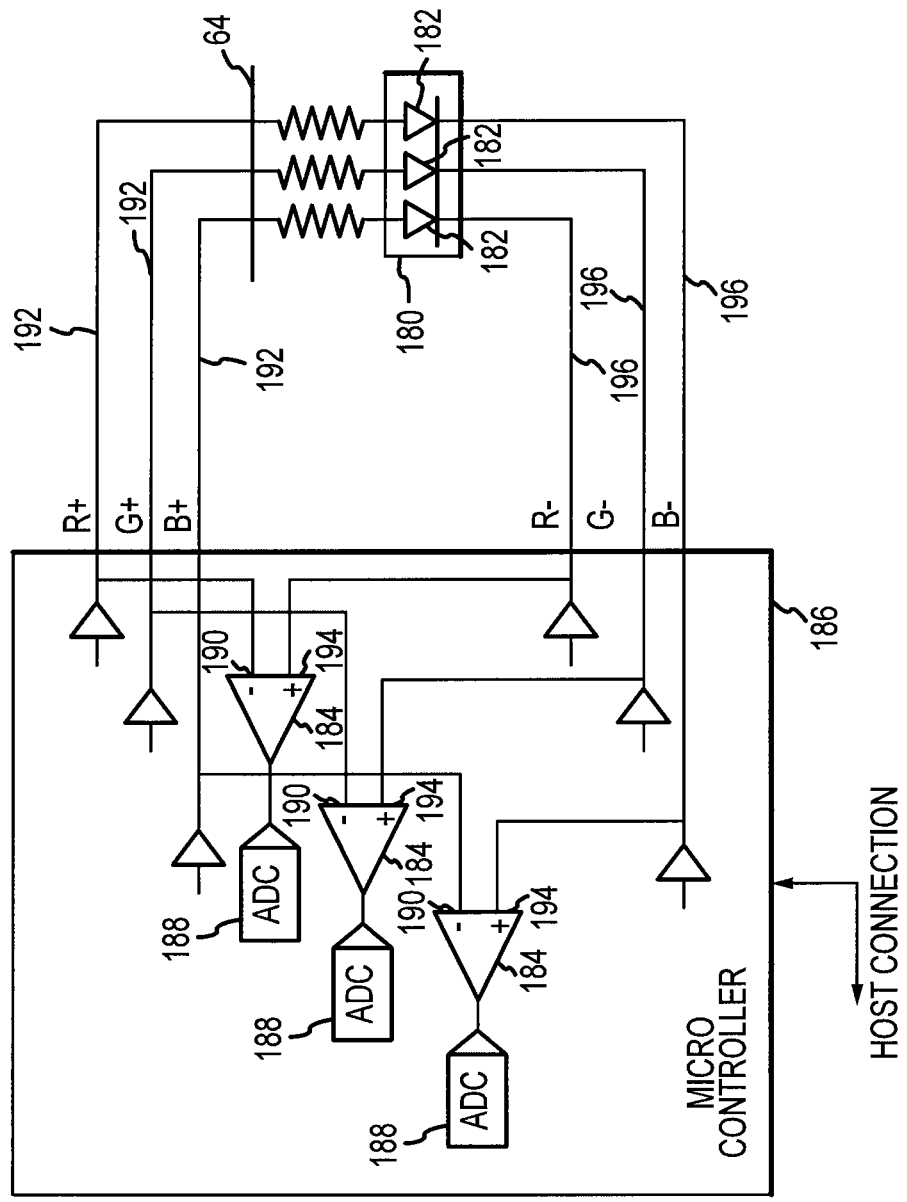
FIG. 13 illustrates implementation of a light source as a light sensor in accordance with an alternative embodiment.

In addition or alternatively, light sources may operate as the light sensors. As illustrated in FIG. 13, a light source 180 may operate as both a light source and a light sensor. Hence, there is no separate light sensor. As illustrated, the light source 180 may be a multicolor LED light, such as the RGB LED light source shown, or a monochromatic LED. Each LED 182 of the light source 180 may operate as a light sensor. In order to operate as a light sensor, the light source 180 may be biased in a non-conducting direction. That is, each LED 182 may be reverse biased. To reverse bias the LEDs 182, amplifiers 184 are provided in a controller 186 that is configured to control the operation of the light source 180. The amplifiers 184 are coupled in between an ADC 188 and the light source 180. Specifically, inverting inputs 190 of the amplifiers 184 are coupled to the anodes 192 of the light source 180 and non-inverting inputs 194 of the amplifiers 184 are coupled to the cathodes 196 of the light source 180.

Each LED 182 of the light source 180 has a leakage current that will dissipate normally either through the diode itself or the large input impedance of the micro-controller in the High-Z state (in the megaOhm range). This increases proportionally to the brightness or the level of ambient light. Thus, if the LEDs 182 are driven during the period T_LED and then reverse biased and sensed during the T_ALS period, the LEDs 182 may operate as both the light sensor and the light source. Additionally, in order to increase the sensitivity, results from sensing of multiple LEDs (such as each of the R, G, and B LEDs 182) can be added together, either in analog or in the digital domain. That is, light sensed by each of the LED 182 of the light source 180 may be added together to determine the amount of ambient light. The determined amount of ambient light may then be used to determine a corresponding light output for the determined ambient light conditions by referencing a calibration table, as discussed above. Thus, the controller 186 may operate the light source 180 to provide a dynamic, desired light output based on current ambient light conditions.

Although the present embodiment has been described with respect to particular embodiments and methods of operation, it should be understood that changes to the described embodiments and/or methods may be made yet still embraced by alternative embodiments of the invention. For example, alternative lighting schemes may be provided to achieve various visual effects in certain ambient lighting conditions not specifically described above. Further, yet other embodiments may omit or add operations to the methods and processes disclosed herein. Still other embodiments may vary the rates of change of color and/or intensity. Accordingly, the proper scope of the present invention is defined by the claims herein.

The invention claimed is:

1. A light control system for an electronic device, comprising:
   a light source;
   a light sensor separate from the light source and configured to sense ambient light levels;
   a light pathway shared by the light sensor and the light source;
   a controller communicatively coupled to the light source and the light sensor, the controller configured to alternately activate the light source and the light sensor during a periodic cycle to illuminate at least a portion of the electronic device, wherein the controller activates the light sensor after a predetermined delay following deactivation of the light source and wherein the controller dynamically adjusts an output of the light source during the periodic cycle based on a sensed amount of ambient light present after the predetermined delay; and
   the light source and light sensor are disposed on a planar surface of a common substrate.

2. The light control system of claim 1 wherein dynamically adjusting the output of the light source comprises adjusting the brightness of the light source by reducing a length of time the light source is activated.

3. The light control system of claim 2 wherein the controller adjusts the brightness of the light source to match the sensed amount of ambient light.

4. The light control system of claim 1 wherein the light source comprises a top-firing LED.

5. The light control system of claim 1 wherein the light source is a side firing LED and the light sensor and light source are located in different axes relative to a longitudinal axis of light pathway.

6. The light control system of claim 1 wherein the controller adjusts the brightness of the light source so that the surface of the light source appears painted in the sensed ambient light conditions.

7. The light control system of claim 1 wherein the light source comprises a multicolored LED.

8. The light control system of claim 1 wherein the light source comprises two or more LEDs and wherein at least one of the two or more LEDs function as the light sensor.

9. The light control system of claim 1 wherein the light sensor comprises one of a photodiode, a phototransistor, or a photodiode and an amplifier.

10. The light control system of claim 1 wherein the light sensor comprises one or more narrowband photosensitive devices.

11. The light control system of claim 1 wherein the light sensor comprises a broadband photosensitive device.

12. The light control system of claim 1 comprising a master controller, wherein the master controller is configured to provide control signals to the controller.

13. The light control system of claim 1 wherein the light source and light sensor are component parts of a single package.

14. A method of operating a light control system for an electronic device, comprising:
    providing a periodic control signal;

activating a light source positioned on a planar surface of a substrate during a first portion of the control signal;

activating a light sensor that is separate from the light source and positioned on the planar surface of the substrate during a second portion of the control signal to determine lighting conditions surrounding the electronic device, the light source and the light sensor positioned beneath a surface of the electronic device and sharing a common light pathway, wherein activating the light sensor during a second portion of the control signal comprises:

providing a first predetermined time delay before actuation of the light sensor and after deactuation of the light source; and providing a second predetermined time delay after deactuation of the light sensor and before actuation of the light source; and during the first portion of the control signal, dynamically adjusting an output of the light source based on the determined lighting conditions.

15. The method of claim 14 comprising pulse width modulating the actuation of the light source during the first portion of the control signal to adjust the brightness of the light output by the light source.

16. The method of claim 14 wherein actuation of the light sensor generates an analog signal correlative to the amount of ambient light, the method comprising converting the analog signal to a digital signal for determination of the amount of ambient light and actuating the light source to correspond with the determined amount of ambient light.

17. The method of claim 14 comprising determining a color of the ambient light and actuating the light source to match the color of the ambient light.

18. A method comprising:

measuring ambient light conditions by a light sensor positioned on a planar surface of a substrate and contained within a housing of a computing device;

adjusting a light output by one or more light sources positioned on the planar surface of the substrate to provide a visual effect for a surface of the computing device based on the corresponding measured ambient light conditions, wherein at least one of the one or more the light sources and light sensor share a common, non-reflected light pathway and at least one of the one or more light sources is separate from the light sensor;

recording the measured ambient light conditions and the corresponding adjusted light output; and programming a device to:

determine ambient light conditions; and actuate the one or more light sources during an actuation cycle shared by the one or more light sources and the light sensor to provide a light output that visually appears as a constant light and corresponds to the determined ambient light conditions based on the recorded data, wherein the ambient light conditions are determined by actuating a light sensor during the actuation cycle after a predetermined delay from when the one or more light sources are no longer actuated during the actuation cycle, such that the one or more light sources appear to be continuously actuated for a time period.

19. The method of claim 18 wherein adjusting the light output comprises pulse width modulating the one or more light sources to obtain a desired color and brightness output that corresponds to the ambient light conditions.

20. A light control system for a portable electronic device, comprising:

a light source;

a light sensor separate from the light source and configured to sense ambient light levels, wherein the light sensor and the light source are co-located on a single planar substrate and a light pathway is shared by the light sensor and the light source, the light pathway being substantially perpendicular to the single planar substrate;

a cover having an optically transmissive aperture disposed over the single planar substrate, wherein light received at the light sensor passes through the optically transmissive aperture and light emitted from the light source passes through the optically transmissive aperture to create an optical effect for the portable electronic device; and a controller communicatively coupled to the light source and the light sensor and adapted to alternately actuate the light source and the light sensor during a periodic cycle that includes a light source portion and a light sensor portion, wherein the controller dynamically adjusts an output of the light source during the light source portion of the periodic cycle based on a sensed amount of ambient light that is detected after a first predetermined delay following the light source portion and before a beginning of the light sensor portion.

21. The package as in claim 20, wherein the light source is actuated after a second predetermined delay following a deactuation of the light sensor.

22. The package as in claim 20, wherein the light source is used as a status indicator of a computing device.

* * * * *